(12) United States Patent
Gregerson et al.

(10) Patent No.: US 9,542,524 B2
(45) Date of Patent: Jan. 10, 2017

(54) STATIC TIMING ANALYSIS (STA) USING DERIVED BOUNDARY TIMING CONSTRAINTS FOR OUT-OF-CONTEXT (OOC) HIERARCHICAL ENTITY ANALYSIS AND ABSTRACTION

(71) Applicant: International Business Machines Corporation, Armonk, NY (US)

(72) Inventors: James C. Gregerson, Hyde Park, NY (US); David J. Hathaway, Underhill, VT (US); Kerim Kalafala, Rhinebeck, NY (US); Tsz-Mei Ko, Poughkeepsie, NY (US); Alex Rubin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 14/606,053

(22) Filed: Jan. 27, 2015

(65) Prior Publication Data
US 2016/0217245 A1 Jul. 28, 2016

(51) Int. Cl.
G06F 17/50 (2006.01)

(52) U.S. Cl.
CPC ................................. *G06F 17/5081* (2013.01)

(58) Field of Classification Search
CPC .................................................. G06F 17/5081
See application file for complete search history.

(56) References Cited

U.S. PATENT DOCUMENTS

| 5,541,849 | A | * | 7/1996 | Rostoker | G01R 31/31704 714/E11.167 |
| 5,544,088 | A | | 8/1996 | Aubertine et al. | |
| 6,665,845 | B1 | * | 12/2003 | Aingaran | G06F 17/5036 716/113 |
| 6,877,139 | B2 | | 4/2005 | Daga | |
| 7,127,693 | B2 | | 10/2006 | Tanaka | |

(Continued)

FOREIGN PATENT DOCUMENTS

WO 03038689 A1 5/2003

OTHER PUBLICATIONS

Yang et al., "Timing-Driven Placement using Design Hierarchy Guided Constraint Generation", IEEE, 2002, pp. 177-180.

*Primary Examiner* — Vuthe Siek
(74) *Attorney, Agent, or Firm* — Gibb & Riley, LLC; Steven J. Meyers, Esq.

(57) ABSTRACT

Disclosed are a system and a method for performing a timing analysis of an integrated circuit (IC). An internal timing constraint of a logic device in a first signal pathway of a hierarchical entity in an IC design is determined based on a reference value and, if necessary, on library information. A first boundary timing constraint associated with the first signal pathway is derived based on the internal timing constraint and a second boundary timing constraint associated with the first signal pathway is derived based on the first boundary timing constraint and a target slack value for the internal timing constraint. A static timing analysis is performed using the second boundary timing constraint. Based on the analysis, a timing abstraction for the hierarchical entity is generated. A timing model for the IC design is generated using the timing abstraction and other timing abstractions for other hierarchical entities in the design.

18 Claims, 6 Drawing Sheets

(56) References Cited

U.S. PATENT DOCUMENTS

| | | |
|---|---|---|
| 7,987,440 B2 | 7/2011 | Kalafala et al. |
| 8,091,056 B1 | 1/2012 | Campbell et al. |
| 8,438,520 B2 | 5/2013 | Carlsen et al. |
| 8,566,765 B1 | 10/2013 | Tzeng |
| 8,627,249 B1 | 1/2014 | Pandey et al. |
| 8,640,066 B1 * | 1/2014 | Gupta ............... G06F 17/505 716/102 |
| 8,683,399 B2 | 3/2014 | Hosoda |
| 8,683,497 B2 | 3/2014 | Lee et al. |
| 8,689,158 B2 | 4/2014 | Kalafala et al. |
| 8,701,075 B2 | 4/2014 | Dartu et al. |
| 2003/0229871 A1 | 12/2003 | Nakae et al. |
| 2005/0062496 A1 | 3/2005 | Gidon et al. |
| 2005/0251780 A1 | 11/2005 | Nakashiba |
| 2006/0048085 A1 * | 3/2006 | Tyler ............... G06F 17/5031 716/113 |
| 2008/0307379 A1 | 12/2008 | Visweswariah |
| 2009/0013292 A1 | 1/2009 | Brunet |
| 2009/0271750 A1 | 10/2009 | Richardson et al. |
| 2010/0180244 A1 | 7/2010 | Kalafala et al. |
| 2011/0307850 A1 | 12/2011 | Dartu et al. |
| 2013/0205269 A1 | 8/2013 | Griesbach et al. |
| 2013/0339912 A1 | 12/2013 | Rao et al. |

\* cited by examiner

STATIC TIMING ANALYSIS (STA) USING DERIVED BOUNDARY TIMING CONSTRAINTS FOR OUT-OF-CONTEXT (OOC) HIERARCHICAL ENTITY ANALYSIS AND ABSTRACTION

BACKGROUND

The present invention relates to integrated circuit design and, more particularly, to a method, a system and a computer program product for performing a static timing analysis (STA) of an integrated circuit using a hierarchical approach.

In integrated circuit design, static timing analysis (STA) is used to predict the performance of an integrated circuit and to verify that the integrated circuit will function correctly. Specifically, STA is used to predict the arrival times of clock and data signals and the results can be compared against established timing requirements (e.g., required arrival times (RATs)) to see if the integrated circuit, as designed, will function properly with a sufficiently high probability. As integrated circuit designs become more and more complex, performing STA on the full top-level design (also referred to herein as the full design) of an integrated circuit is no longer a viable option due to the large runtime and memory requirements for completing the analysis. Therefore, integrated circuit designers have turned to a hierarchical approach for performing a STA.

With a hierarchical approach, STA is performed on hierarchical entities (i.e., individual blocks of logic, also referred to herein as lower-level entities or macros) that can form any number of hierarchical levels within the full top-level design. Based on the results of the STA at the lower levels of hierarchy, the hierarchical entities are abstracted (i.e., timing abstractions are generated for the hierarchical entities) and these timing abstractions are subsequently used to analyze an overall timing model for the full top-level design. In the hierarchical approach described above, each timing abstraction for each specific hierarchical entity only contains relevant timing information required for incorporating that specific hierarchical entity into the full top-level design or into a block at the higher level of hierarchy. That is, each timing abstraction for each specific hierarchical entity only contains periphery timing information that will impact adjacent hierarchical entities within the design (i.e., that will impact other hierarchical entities that interface with the specific hierarchical entity in the design) and does not include internal timing information. The runtime and memory requirements can be further reduced by allowing a single out-of-context (OOC) timing run to generate a timing abstract that can replace potentially numerous instances of the given hierarchical entity at the next level of hierarchy.

While the overall runtime and memory requirements are reduced with the hierarchical approach, the overall accuracy is also reduced. Specifically, in order to generate an accurate timing abstract for a specific hierarchical entity, some knowledge of timing constraints at the boundary of that specific hierarchical entity (i.e., some knowledge of in-context boundary timing constraints) is required. These in-context boundary timing constraints can include, for example, the arrival times (ATs) of primary inputs (PIs) to the specific hierarchical entity and the required arrival times (RATs) specifying the expected signal arrival time at the primary outputs (POs) of the specific hierarchical entity. Since such boundary timing constraints necessarily impact any timing analysis of the specific hierarchical entity and since boundary timing constraints will vary for different instances of the specific hierarchical entity at different locations within the full top-level design, assumptions must be made about the boundary timing constraints to ensure that the analysis and resulting timing abstraction for the specific hierarchical entity is valid for any possible context (i.e., for any instance of the specific hierarchical entity anywhere in the integrated circuit). In addition, as top-level logic changes are made to address functional or performance issues, the boundary timing constraints of any hierarchical entity (whether used multiple times at the chip level or not) can be impacted. To avoid significant impact, the boundary timing constraints used in an OOC timing run are generally assumed to be overly pessimistic. As a result, timing fails for instances of the specific hierarchical entity are often reported based on conditions that would not occur in any actual context. Consequently, hierarchical entities, which would in fact function properly within the full top-level design, must be redesigned, thereby impacting over-all circuit performance and time-to-market. Therefore, there is a need in the art for an improved technique for performing a static timing analysis (STA) of an integrated circuit using a hierarchical approach, wherein the assumptions made regarding boundary timing constraints during an out-of-context STA of the hierarchical entity are less pessimistic, but still valid for any possible context.

SUMMARY

In view of the foregoing, disclosed herein are a system, a method and a computer program product for performing a static timing analysis (STA) of an integrated circuit using a hierarchical approach, wherein an internal timing constraint of a specific logic device in a first signal pathway of a hierarchical entity can be determined based on a reference value (e.g., a clock arrival time) and, if necessary, on library information for that specific logic device (e.g., a pre-established timing test for the specific logic device). A first boundary timing constraint associated with the first signal pathway can be derived based on the internal timing constraint and a second boundary timing constraint associated with the first signal pathway can be derived based on the first boundary timing constraint and a target slack value for the internal timing constraint. Subsequently, a static timing analysis of the hierarchical entity can be performed (e.g., using the second boundary timing constraint). Based on this static timing analysis, a timing abstraction for the hierarchical entity can be generated. By deriving the boundary timing constraints based on a known internal timing constraint, the resulting timing abstraction for the hierarchical entity is not overly pessimistic and is still valid for any possible context. A timing model for the integrated circuit design can then be generated using the timing abstraction for the hierarchical entity and other timing abstractions for other hierarchical entities within the integrated circuit design.

More particularly, disclosed herein is a system for performing a static timing analysis (STA) of an integrated circuit using a hierarchical approach. This system can comprise a memory that stores an integrated circuit design, which is partitioned into multiple hierarchical entities, and library information for logic devices in each of the hierarchical entities.

The system can further comprise at least one processor that accesses the memory. The processor can identify multiple signal pathways within at least one hierarchical entity that was selected for analysis from amongst the multiple hierarchical entities. The multiple signal pathways can comprise at least a first signal pathway. The first signal pathway can receive a primary input to the hierarchical entity and/or can output a primary output from the hierarchical entity.

The processor can further determine an internal timing constraint of a specific logic device within the first signal pathway. This internal timing constraint can be determined based on a reference value (e.g., a clock arrival time) and, if necessary, on library information associated with that specific logic device (e.g., a pre-established timing test, also referred to as a pre-established timing window, for the specific logic device). It should be noted that, when the first signal pathway receives a primary input to the hierarchical entity, the specific logic device for which this internal timing constraint is determined should be the initial storage element (i.e., an initial flip flop or an initial latch) in the first signal pathway. However, when the first signal pathway outputs a primary output, the specific logic device for which this internal timing constraint is determined should be the last storage element (i.e., the last flip flop or last latch) in the first signal pathway. As discussed in the detailed description section below, the internal timing constraint and how it is determined will vary depending upon whether the specific logic device is the first (i.e., initial) or last storage element within the first signal pathway.

After the internal timing constraint is determined, the processor(s) can derive multiple boundary timing constraints associated with the first signal pathway. Specifically, a first boundary timing constraint associated with the first signal pathway can be derived based on the internal timing constraint. Subsequently, a second boundary timing constraint, which is also associated with the first signal pathway and which is different from the first boundary timing constraint, can be derived based on the first boundary timing constraint and further based on a target slack value for the internal timing constraint. As discussed in the detailed description section below, these boundary timing constraints will vary depending upon whether they are associated with a primary input or a primary output.

In any case, after the second boundary timing constraint is determined, the processor can perform a static timing analysis of the hierarchical entity (e.g., using that second boundary timing constraint). If this multiple signal pathways identified also include a second signal pathway adjacent to the first signal pathway such that the first and second signal pathways may be subject to noise coupling, which can impact the timing characteristics of both the first pathway and the second pathway, this static timing analysis can, for example, take into consideration any noise coupling between the first signal pathway and the second signal pathway. Subsequently, a timing abstraction for the hierarchical entity can be generated based on the timing analysis (independent of any noise coupling between the first signal pathway and the second signal pathway).

The processor can further generate other timing abstractions for other hierarchical entities within the integrated circuit design and a timing model for the integrated circuit design using all of these timing abstractions (i.e., the timing abstraction for the hierarchical entity and the other timing abstractions generated for other hierarchical entities).

Also disclosed herein is a method for performing a static timing analysis (STA) of an integrated circuit using a hierarchical approach. This method can comprise storing, in memory, an integrated circuit design, which is partitioned into multiple hierarchical entities, and library information for logic devices in each of the hierarchical entities.

The method can further comprise accessing the memory and identifying multiple signal pathways within at least one hierarchical entity, which was selected for analysis from amongst the multiple hierarchical entities within the integrated circuit design. The multiple signal pathways can comprise at least a first signal pathway. The first signal pathway can receive a primary input to the hierarchical entity and/or can output a primary output from the hierarchical entity.

Next, an internal timing constraint of a specific logic device within the first signal pathway can be determined based on a reference value (e.g., a clock arrival time) and, if necessary, on library information associated with that specific logic device (e.g., a pre-established timing test, also referred to as a pre-established timing window, for the specific logic device). It should be noted that, when the first signal pathway receives a primary input to the hierarchical entity, the specific logic device for which this internal timing constraint is determined should be the initial storage element (i.e., the initial flipflop or initial latch) in the first signal pathway. However, when the first signal pathway outputs a primary output, the specific logic device for which this internal timing constraint is determined should be the last storage element (i.e., the last flipflop or last latch) in the first signal pathway. As discussed in the detailed description section below, the internal timing constraint and how it is determined will vary depending upon whether the specific logic device is the first (i.e., initial) or last storage element within the first signal pathway.

After the internal timing constraint is determined, a first boundary timing constraint associated with the first signal pathway can be derived based on the internal timing constraint. Subsequently, a second boundary timing constraint, which is also associated with the first signal pathway and which is different from the first boundary timing constraint, can be derived based on the first boundary timing constraint and further based on a target slack value for the internal timing constraint. As discussed in the detailed description section below, these boundary timing constraints will vary depending upon whether they are associated with a primary input or a primary output.

In any case, after the second boundary timing constraint is determined, a static timing analysis of the hierarchical entity can be performed (e.g., using the second boundary timing constraint). If this multiple signal pathways identified also include a second signal pathway adjacent to the first signal pathway such that the first and second signal pathways may be subject to noise coupling, which can impact the timing characteristics of both the first pathway and the second pathway, this static timing analysis can, for example, take into consideration any noise coupling between the first signal pathway and the second signal pathway. Then, a timing abstraction for the hierarchical entity can be generated based on the static timing analysis (independent of any noise coupling between the first signal pathway and the second signal pathway).

Other timing abstractions can be generated for other hierarchical entities within the integrated circuit design and a timing model for the integrated circuit design can subsequently be generated using all of these timing abstractions (i.e., the timing abstraction for the hierarchical entity and the other timing abstractions generated for other hierarchical entities).

Also disclosed herein is a computer program product. This computer program product can comprise a computer readable storage medium having program instructions embodied therewith. The program instructions can be executable by a computer to cause the computer to perform the above-described method for performing a static timing analysis (STA) using a hierarchical approach.

BRIEF DESCRIPTION OF THE DRAWINGS

The embodiments herein will be better understood from the following detailed description with reference to the drawings, which are not necessarily drawn to scale and in which.

DETAILED DESCRIPTION

Figure 1:
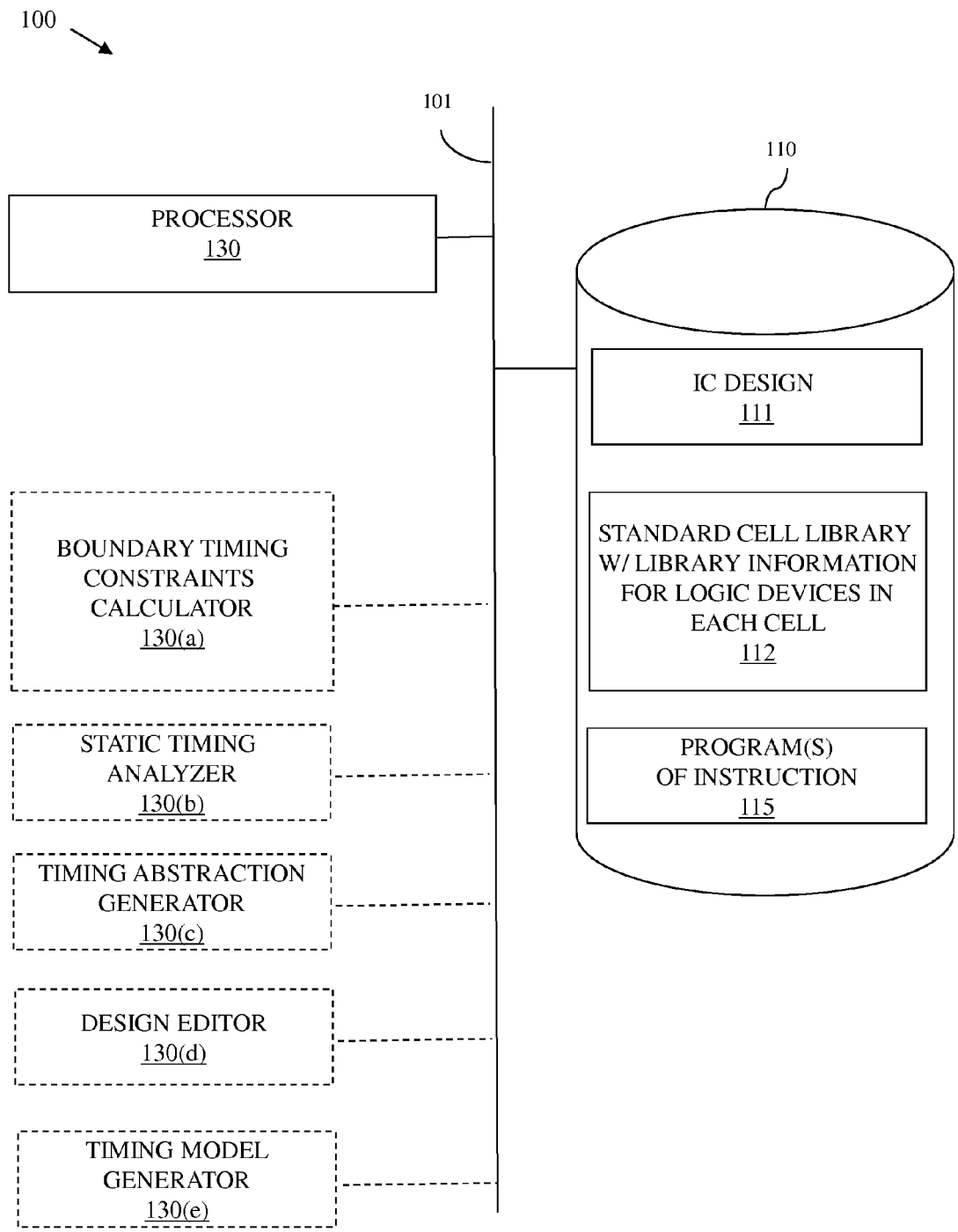
FIG. 1 is a schematic diagram illustrating a system for performing a static timing analysis of an integrated circuit using a hierarchical approach.

As mentioned above, in a hierarchical approach, static timing analysis (STA) is performed on hierarchical entities to reduce the overall runtime and memory requirements; however, overall accuracy is also reduced. Specifically, in order to generate an accurate timing abstract for a specific hierarchical entity in a STA, some knowledge of in-context boundary timing constraints (e.g., arrival times (ATs) of primary inputs (PIs) to the specific hierarchical entity and the required arrival times (RATs) specifying the expected signal arrival time at the primary outputs (POs) of the specific hierarchical entity) is required. Since such boundary timing constraints necessarily impact any timing analysis of the specific hierarchical entity and since boundary timing constraints will vary for different instances of the specific hierarchical entity at different locations within the full top-level design, assumptions must be made about the boundary timing constraints to ensure that the analysis and resulting timing abstraction for the specific hierarchical entity is valid for any possible context (i.e., for any instance of the specific hierarchical entity anywhere in the integrated circuit). In addition, as top-level logic changes are made to address functional or performance issues, the boundary constraints of any hierarchical entity (whether used multiple times at the chip level or not) can be impacted. To avoid significant impact, the boundary timing constraints used in an OOC timing run are generally assumed to be overly pessimistic. As a result, timing fails for instances of the specific hierarchical entity are often reported based on conditions that would not occur in any actual context. Consequently, hierarchical entities, which would in fact function properly within the full top-level design, must be redesigned, thereby affecting over-all circuit performance and time-to-market.

In view of the foregoing, disclosed herein are a system, a method and a computer program product for performing a static timing analysis (STA) of an integrated circuit using a hierarchical approach, wherein an internal timing constraint of a specific logic device in a first signal pathway of a hierarchical entity can be determined based on a reference value (e.g., a clock arrival time) and, if necessary, on library information for that specific logic device (e.g., a pre-established timing test for the specific logic device). A first boundary timing constraint associated with the first signal pathway can be derived based on the internal timing constraint and a second boundary timing constraint associated with the first signal pathway can be derived based on the first boundary timing constraint and on a target slack value for the internal timing constraint. Subsequently, a static timing analysis of the hierarchical entity can be performed (e.g., using the second boundary timing constraint). Based on this static timing analysis, a timing abstraction for the hierarchical entity can be generated. By deriving the boundary timing constraints based on a known internal timing constraint, the resulting timing abstraction for the hierarchical entity is not overly pessimistic and is still valid for any possible context. A timing model for the integrated circuit design can then be generated using the timing abstraction for the hierarchical entity and other timing abstractions for other hierarchical entities within the integrated circuit design.

More particularly, referring to FIG. 1, disclosed herein is a system 100 for performing a static timing analysis (STA) of an integrated circuit using a hierarchical approach. This system 100 can comprise a computer system comprising a memory 110 (e.g., at least one computer readable storage medium, such as a computer readable storage device). The memory 110 can store an integrated circuit design 111, a standard cell library with library information 112, and one or more programs 115 of instruction.

The integrated circuit design 111 can be partitioned into multiple hierarchical entities. That is, this integrated circuit design 111 can comprise a full top-level design for an integrated circuit and that full top-level design can incorporate multiple hierarchical entities. For purposes of this disclosure, a hierarchical entity refers to a block of logic (also referred to herein as a lower-level entity or macro). The multiple hierarchical entities can, for example, comprise different hierarchical entities as well as multiple instances of the same hierarchical entity. That is, the same hierarchical entity (i.e., a hierarchical entity with a specific design) may be reused at various different locations within the full top-level design 111 for the integrated circuit.

The standard cell library can contain library information 112 for various standard cells. Those skilled in the art will recognize that standard cells comprise the transistors and interconnect structures that make up logic devices (e.g., logic gates or storage elements, such as flipflops or latches). Standard cells can be simple (i.e., comprising only a single logic device) or complex (i.e., comprising multiple interconnect logic devices). Each standard cell can, for example, comprise a gate-level design for the logic device(s) (e.g., in the form of a netlist) and can be associated with corresponding library information including, but not limited to, timing information, power information and noise information for that standard cell. Timing information for a specific storage element (i.e., a specific flipflop or latch) can include, but is not limited to, a pre-established timing test, also referred to as a pre-established timing window, for the specific storage element. Each hierarchical entity within the integrated circuit design 111 can comprise a plurality of different previously selected standard cells. It should be understood that this description of the standard cell library is not intended to be limiting. For example, although a gate-level design is referenced above, the hierarchical approach to static timing analysis (STA) disclosed herein can be performed using a either transistor-level timing or gate-level timing.

The system 100 can further comprise at least one processor in communication with the memory 110 (e.g., over a system bus 101, as illustrated, or over a wired or wireless network). For example, the system 100 can comprise a single specialized processor 130 (e.g., a single specialized computer processing unit) that, during STA of an integrated circuit, performs (i.e., that is adapted to perform, that is configured to perform and/or that executes multiple programs 115 of instructions to perform) multiple process steps, as described in detail below. Alternatively, the system 100 can comprise multiple specialized processors 130(*a*)-(*e*) (e.g., multiple specialized computer processing units), wherein, during STA of an integrated circuit, each processor performs (i.e., is adapted to perform, is configured to perform and/or executes one or more program of instructions 115 to perform) one or more of the multiple process steps, as described in detail below. For purposes of illustration, five different special purpose processor(s) are shown in FIG. 1 including a boundary timing constraints calculator 130(*a*), a static timing analyzer 130(*b*), a timing abstraction generator 130(*c*), a design editor 130(*d*) and a timing model generator 130(*e*).

In any case, at least one hierarchical entity can be selected (e.g., by a designer through a user interface) for analysis from amongst the multiple hierarchical entities in the integrated circuit design 111. It should be noted that all of the different hierarchical entities in the integrated circuit design 111 can eventually be selected for analysis in order to generate a timing model for the integrated circuit itself. However, multiple instances of the same hierarchical entity within the integrated circuit design at different locations may only have to be selected for analysis a single time. Furthermore, a given hierarchical entity can be processed independently without any knowledge of upper level hierarchical entities and without any knowledge of the full top-level design.

As mentioned above, since the static timing analysis (STA) of any selected hierarchical entity is performed out-of-context, the in-context boundary timing constraints for the selected hierarchical entity are not known. These in-context boundary timing constraints can include, for example, the arrival times (ATs) of primary inputs (PIs) to the specific hierarchical entity and the sensitivity windows (i.e., required arrival times (RATs)) at logic devices downstream of primary outputs (POs) (i.e., outside of the hierarchical entity). Since such boundary timing constraints necessarily impact any static timing analysis (STA) of the hierarchical entity, values for these boundary timing constraints must somehow be estimated in order to ensure that the subsequent analysis and resulting timing abstraction for the selected hierarchical entity will be valid for any possible context (i.e., for any instance of the selected hierarchical entity located anywhere in the integrated circuit). In the embodiments disclosed herein, the boundary timing constraints of the selected hierarchical entity are derived based on known internal timing constraints of the selected hierarchical entity (e.g., timing constraints of logic devices within the selected hierarchical entity).

More specifically, once a hierarchical entity is selected, the processor 130 (or, if applicable, the boundary timing constraints calculator 130(*a*)) can access the memory 110 and can evaluate the selected hierarchical entity and, specifically, can identify the multiple signal pathways contained therein. These multiple signal pathways can comprise, for example, any first signal pathways, which receive a primary input to the selected hierarchical entity and/or which output a primary output from the selected hierarchical entity. As discussed in greater detail below, these multiple signal pathways may also comprise any second signal pathways that are adjacent to the first signal pathways such that noise coupling between first and second signal pathways may occur.

Figure 2:
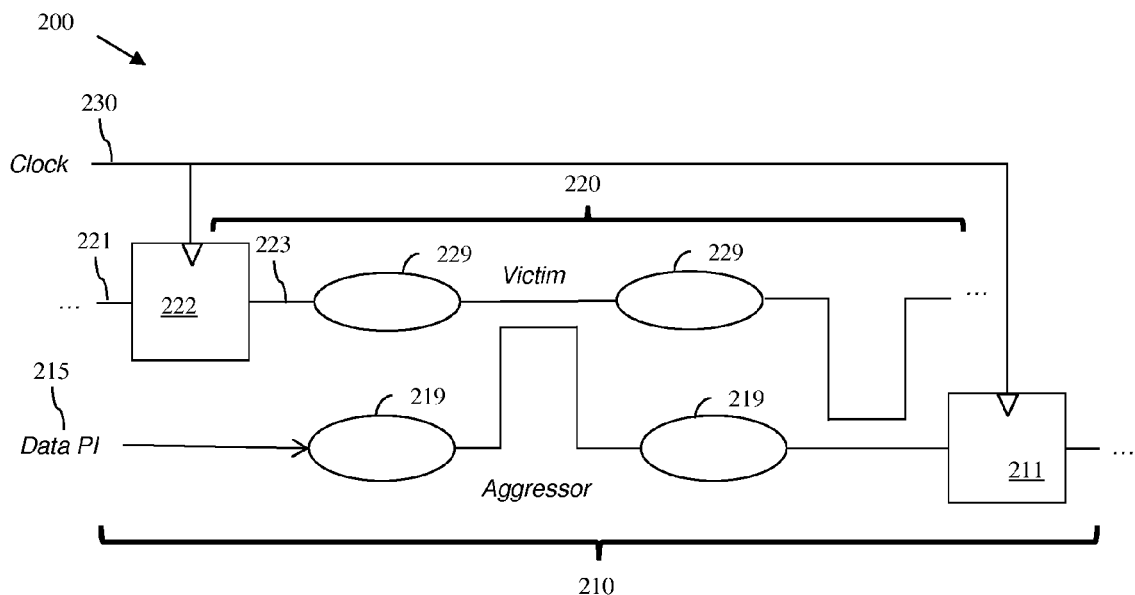
FIG. 2 is a schematic diagram illustrating a portion of a hierarchical entity.

For example, FIG. 2 illustrates a portion of an exemplary selected hierarchical entity 200. This hierarchical entity 200 comprises, among other signal pathways (not shown), a first signal pathway 210, which receives a primary input 215, and also a second signal pathway 220 adjacent to the first signal pathway 210. Noise coupling between the first signal pathway 210 and the second signal pathway 220 may occur and, particularly, the first signal pathway 210 may be an aggressor signal pathway and the second signal pathway 220 may be a victim signal pathway such that switching of the primary input 215 has the potential to impact a critical transition of the second signal pathway 220.

Figure 3:
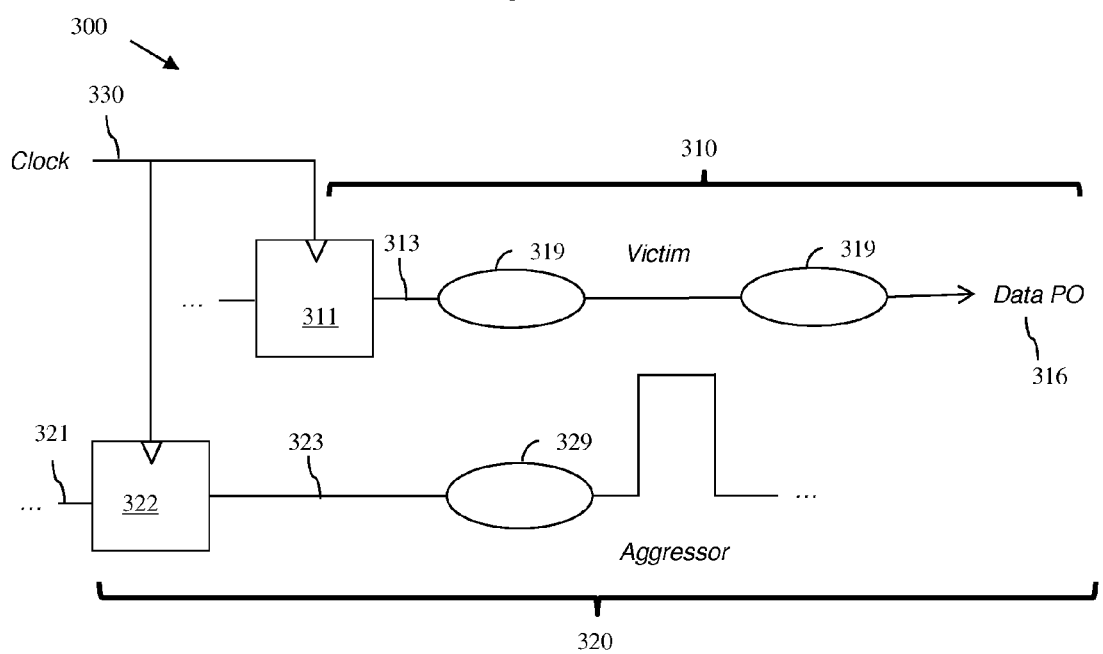
FIG. 3 is a schematic diagram illustrating a portion of another hierarchical entity.

FIG. 3 illustrates a portion of an exemplary hierarchical entity 300. This hierarchical entity 300 comprises, among other signal pathways (not shown), a first signal pathway 310, which outputs a primary output 316, and also a second signal pathway 320 adjacent to the first signal pathway 310. Noise coupling between the first signal pathway 310 and the second signal pathway 320 may occur and, particularly, the second signal pathway 320 may be an aggressor signal pathway and the first signal pathway 310 may be a victim signal pathway such that signal switching of the second signal pathway 320 has the potential to impact the primary output 316 and, thereby the potential to violate the timing window of an external logic device downstream of the primary output 316.

The system 100 disclosed herein derives boundary timing constraints that are associated with the first signal pathways and that can be used during a static timing analysis (STA) of the selected hierarchical entity. In order to derive these boundary timing constraints for a given first signal pathway, the processor 130 (or, if applicable, the boundary timing constraints calculator 130(*a*)) can first determine an internal timing constraint of at least one specific logic device within that first signal pathway. This internal timing constraint can be determined based on a reference value (e.g., a clock arrival time or some other reference value) and, if necessary, on library information associated with that specific logic device (e.g., a pre-established timing test, also referred to as a pre-established timing window, for the specific logic device). It should be noted that, when the first signal pathway receives a primary input to the selected hierarchical entity (as in the hierarchical entity 200 of FIG. 2), the specific logic device for which this internal timing constraint is determined should be an initial storage element (i.e., an initial flipflop or initial latch) within the first signal pathway. However, when the first signal pathway outputs a primary output (as in the hierarchical entity 300 of FIG. 3), the specific logic device for which this internal timing constraint is determined should be the last storage element (i.e., the last flipflop or last latch) within the first signal pathway. It should also be noted that the internal timing constraint and how it is determined will vary depending upon whether the specific logic device is the first or last storage element within the first signal pathway.

For example, referring to the hierarchical entity 200 of FIG. 2, the primary input 215 can be propagated along the first signal pathway 210 (e.g., through any logic devices and/or connecting wires 219) to an initial storage element 211 (i.e., the very first storage element within the first signal pathway), which is controlled by a reference signal (e.g., a clock signal 230). In this case, an internal timing constraint and, particularly, a required arrival time for the initial storage element 211 (ISE-RAT) can be determined based on the arrival time of the clock signal 230 (CS-AT) at the initial storage element 211 and further based on library information associated with that initial storage element 211 (e.g., a pre-established timing test, also referred to as a pre-established timing window, for the initial storage element 211). Specifically, the ISE-RAT can be determined as the CS-AT plus the amount of time specified by the pre-established timing window for the initial storage element 211 as set forth in the library information. Thus, in this case, all that is required at the PI is a PI slew value, which can be used to calculate downstream delays and, thereby used to determine the internal timing constraint (i.e., the ISE-RAT).

Referring to the hierarchical entity 300 of FIG. 3, the first signal pathway 310 can comprise a storage element 311, which is the very last storage element in the first signal pathway 310 and which is controlled by a reference signal (e.g., a clock signal 330). This last storage element 311 can output a signal 313 that is propagated along the remaining portion of the first signal pathway (e.g., through any logic devices and/or connecting wires 319) and out of the hierarchical entity (i.e., as the primary output 316) to an external logic device. In this case, an internal timing constraint and, particularly, the arrival time for the last storage element 311 (LSE-AT) within the first signal pathway 310 can be determined to be the same as (i.e., equal to) the arrival time of the clock signal 330 (CS-AT) at the last storage element 311 plus the propagation delay of the clock to output path through that last storage element 311, as indicated by library information, which is specifically associated with the last storage element 311.

Those skilled in the art will recognize that, unlike the boundary timing constraints of data signals (primary inputs and/or primary outputs), the timing constraints of a reference signal and, particularly, of a reference clock signal can be readily estimated out-of-context.

After the internal timing constraint is determined, the processor 130 (or, if applicable, the boundary timing constraints calculator 130(a)) can derive multiple boundary timing constraints (e.g., an arrival time and a required arrival time) associated with the first signal pathway and, particularly, associated with the primary input (PI) or primary output (PO), as applicable. Specifically, a first boundary timing constraint associated with the first signal pathway can be derived based on the internal timing constraint and a second boundary timing constraint, which is also associated with the first signal pathway and which is different from the first boundary timing constraint, can be derived based on the first boundary timing constraint and also based on a target slack value associated with the internal timing constraint. It should be noted that the order in which these boundary timing constraints are derived (e.g., arrival time first or required arrival time first) will vary depending upon the internal timing constraint and whether boundary timing constraints are associated with a primary input (PI) or a primary output (PO).

For example, as mentioned above with regard to the portion of the hierarchical entity 200 of FIG. 2, the internal timing constraint can be the required arrival time for the initial storage element 211 (ISE-RAT). This ISE-RAT can be propagated backwards through the first signal pathway 210 from the initial storage element 211 through the logic devices and/or connecting wires 219 and to the primary input (PI) in order to derive a first boundary timing constraint associated with the first signal pathway 210 and, particularly, a required arrival time for the primary input 215 (PI-RAT) at the hierarchical entity 200. That is, a determination is made regarding the amount of time it would take for the primary input 215 to pass through the logic devices and/or connecting wires 219 and arrive at the initial storage element 211 and that amount of time is subtracted from the ISE-RAT in order to determine the PI-RAT. Subsequently, a second boundary timing constraint can be derived based on the first boundary timing constraint and further based on a target slack value for the internal timing constraint (i.e., for the ISE-RAT). Specifically, an arrival time of the primary input (PI-AT) at the hierarchical entity 200 can be derived based on the PI-RAT, given, for example, a target slack value for the internal timing constraint of zero (i.e., given PI-AT=PI-RAT). Alternatively, an arrival time of the primary input (PI-AT) at the hierarchical entity 200 can be derived based on the PI-RAT, given some other target slack value for the internal timing constraint (e.g., a target positive slack or a target negative slack). This target slack value can, for example, be determined by the slack threshold used in the top-level design.

As mentioned above with regard to the portion of the hierarchical entity 300 of FIG. 3, the internal timing constraint can be the arrival time for the last storage element 311 (LSE-AT) within the first signal pathway 310, which can be considered to be the same as (i.e., equal to) the arrival time of the clock signal 330 (CS-AT) plus the delay through the storage element 311, as indicated by library information that is specifically associated with the last storage element 311. This LSE-AT can be propagated forward through the first signal pathway 310 and, particularly, through the logic devices and/or connecting wires 319 to derive a first boundary timing constraint associated with the first signal pathway 310 and, particularly, an arrival time of the primary output 316 (PO-AT) at a downstream external logic device (i.e., a logic device that is outside of the hierarchical entity 300 and that receives the primary output 316). That is, a determination is made regarding the amount of time it would take for the signal 313 from the last storage element 311 to pass through the logic devices and/or connecting wires 319 and arrive as the primary output 316 at the downstream external logic device. This amount of time is then added to the LSE-AT in order to determine the PO-AT. Subsequently, a second boundary timing constraint can be derived based on the first boundary timing constraint. Specifically, a required arrival time of the primary output 316 (PO-RAT) at the downstream external logic device can be derived based on the PO-AT, given, for example, a target slack value for the internal timing constraint of zero (i.e., given PO-RAT=PO-AT). Alternatively, the required arrival time of the primary output 316 (PO-RAT) at the downstream external logic device can be derived based on the PO-AT, given some other target slack value for the internal timing constraint (e.g., a target positive slack or a target negative slack). This target slack value can be determined, for example, by the slack threshold used in the top-level design.

In any case, after the second boundary timing constraint is determined, the processor 130 (or, if applicable, the static timing analyzer 130(b)) can perform a static timing analysis of the selected hierarchical entity using the second boundary timing constraint to provide context at the PI or PO, as applicable. This static timing analysis can comprise, for example, a deterministic static timing analysis (DSTA), a statistical static timing analysis (SSTA) or any other suitable static timing analysis. That is, the static timing analysis can comprise any static timing analysis wherein timing quantities are propagated, including deterministic static timing analyses wherein the propagated timing quantities are deterministic scalar values or statistical static timing wherein the propagated timing quantities are statistical distributions represented, for example, in underlying canonical form. Furthermore, this static timing analysis may use any of gate-level timing, transistor-level timing, timing in the presence of multiple clock domains, timing involving separate propagation of rising and falling transitions, timing involving separate propagation for early and late mode signals, timing in the presence of clock gating tests, timing in the presence of domino tests, and/or any combinations thereof. Such techniques for performing static timing analyses are well known in the art and, thus, the details are omitted from this specification in order to allow the reader to focus on the salient aspects of the disclosed embodiments.

It should be noted that in selected hierarchical entities such as those shown in FIGS. 2-3, this static timing analysis can, optionally, be performed so as to take into consideration noise coupling (i.e., cross-talk) between the first signal pathway and any second signal pathway that is immediately adjacent to the first signal pathway (also using the previously derived second boundary timing constraint). That is, the static timing analysis can also incorporate the performance of an analysis of noise coupling (i.e., an analysis of cross-talk). It should further be understood that, optionally, this static timing analysis of the selected hierarchical entity can also incorporate any other types of analyses typically performed as a part of a static timing analysis (e.g., delay analyses, glitch noise analyses, etc.).

For example, as mentioned above, the hierarchical entity 200 of FIG. 2 can further comprise a second signal pathway 220 that is immediately adjacent to the first signal pathway 210 such that noise coupling between the first signal pathway 210 and the second signal pathway 220 may occur. Additionally, within the second signal pathway 220, a second storage element 222, which can also be controlled by the clock signal 230 (as shown), can output a signal 223 that is propagated along the second signal pathway 220 (e.g., through any logic devices and/or connecting wires 229). In this case, the static timing analysis may incorporate a noise coupling analysis so that the aggressor timing window can be limited and further so that overlap between the victim timing window and the aggressor timing window can also be limited in order to reduce the pessimism of the timing of the hierarchical entity 200 based on the results of the static timing analysis. Specifically, the second boundary timing constraint (i.e., the arrival time of the primary input (PI-AT)) can be propagated forward to the initial storage element 211. As a result of this forward propagation, more exact arrival time windows will be established for the net marked as aggressor. The more precise arrival time window computed for the aggressor net in first signal pathway 210 will reduce the chances of aggressor window overlap with victim net in the second signal pathway 220. This reduced overlap will result in a smaller noise event as can be computed by means known by those practicing the prior art.

Similarly, as mentioned above, the hierarchical entity 300 of FIG. 3 can also comprise a second signal pathway 320 that is immediately adjacent to the first signal pathway 310 such that noise coupling between the first signal pathway 310 and the second signal pathway 320 may occur. Additionally, within the second signal pathway 320, a second storage element 322, which can also be controlled by the clock signal 330 (as shown), can output yet another signal 323 that is propagated along the second signal pathway 320 (e.g., through any logic devices and/or connecting wires 329). Again, the static timing analysis may incorporate a noise coupling analysis so that the aggressor timing window can be limited and further so that overlap between the victim timing window and the aggressor timing window can also be limited in order to reduce the pessimism of the timing of the hierarchical entity based on the results of the static timing analysis. Specifically, the second boundary timing constraint (i.e., the required arrival time of the primary output 316 (PO-RAT)) can be propagated backward through the first signal pathway 310. As a result of this backward propagation, more exact required arrival time windows will be established for the net marked as victim. The more precise required arrival time for the net marked victim in the first signal pathway 310 will reduce the chances of aggressor window overlap with net marked aggressor in second signal pathway 320. This reduced overlap will result in a smaller noise event as can be computed by means known by those practicing the prior art.

Those skilled in the art will recognize that inclusion of the above-described noise coupling analysis increases the accuracy of the results of the static timing analysis.

It should be noted that, for purposes of this disclosure the "signal pathways" can refer to diverging and/or converging networks of signal pathways such that the net at which a first signal pathway and a second signal pathway (e.g., the first signal pathway 210 and second signal pathway 220 of FIG. 2 or the first signal pathway 310 and the second signal pathway 320 of FIG. 3) are subject to noise coupling, need not be one of the nets through which the internal timing constraint propagated to the boundary point at which a boundary timing constraint was derived.

Optionally, following performance of the static timing analysis, the processor 130 (or, if applicable, the design editor 130(c)) can make design adjustments to the selected hierarchical entity based on the results of the static timing analysis. To accomplish this, the specific logic device for which the internal timing constraint is determined can, for example, be replaced with a new logic device (i.e., a replacement logic device). Once the specific logic device is replaced, the processor 130 (or, if applicable, the boundary timing constraints calculator 130(a), the static timing analyzer 130(b), the timing abstraction generator 130(c) and the design editor 130(d) in combination) can iteratively repeat the following processes to minimize overlap between victim and aggressor timing windows prior to generating a timing abstraction for the hierarchical entity or generating a timing model for the integrated circuit design 111, as described below: determining the internal timing constraint (in this case the internal timing constraint associated with the new logic device); deriving the first boundary timing constraint; deriving the second boundary timing constraint; performing the static timing analysis (including, if applicable, any noise coupling or other type of analyses typically performed as a part of a static timing analysis); and making design adjustments.

Figure 4:
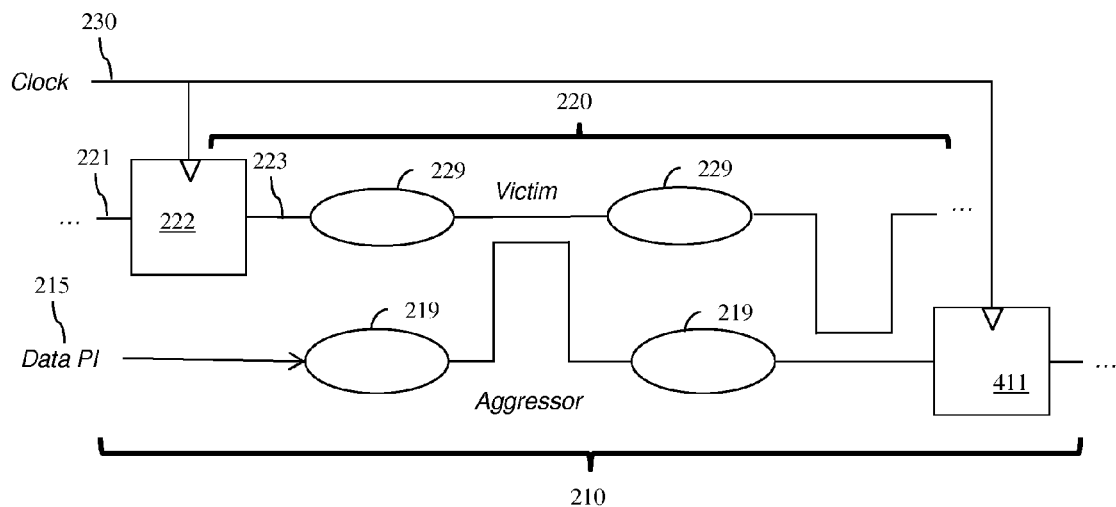
FIG. 4 is a schematic diagram illustrating changes in the hierarchical entity of FIG. 2 following design adjustments.

For example, if the initial storage element 211 in the first signal pathway 210 of the hierarchical entity 200 of FIG. 2 is replaced with a replacement initial storage element 411, as shown in FIG. 4, that has a different, smaller, timing window, as indicated by the library information associated with that replacement initial storage element 411, the late mode required arrival time of the replacement initial storage element will necessarily be less than the late mode ISE-RAT, whereas the early mode required arrival time of the replacement initial storage element will necessarily be more than the early mode ISE-RAT. Furthermore, if this value is propagated back to the primary input 215, the first boundary timing constraint (i.e., the PI-RAT) will show a corresponding change (i.e., will be an earlier time in the late mode and a later time in the early mode) and, thus, so will the second boundary timing constraint (i.e., the PI-AT). As a result, the static timing analysis (including, if applicable, any noise coupling or other type of analyses typically performed as a part of a static timing analysis) will be based on a different arrival time for the primary input. Thus, replacement of the initial storage element 211 with a replacement initial storage element 411 can be performed so that the timing abstraction indicates a lesser amount of overlap between victim and aggressor timing windows.

Figure 5:
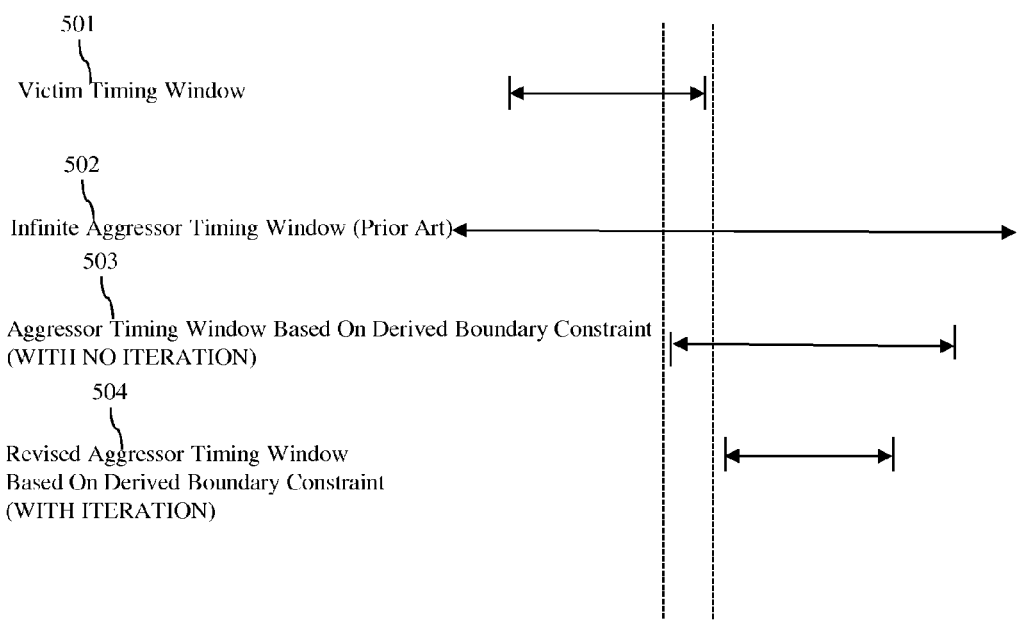
FIG. 5 is an exemplary timing chart corresponding to the portion of the hierarchical entity of FIG. 2.

FIG. 5 is a timing chart illustrating the victim timing window 501 for the second signal pathway 220 relative three different aggressor timing windows: an infinite aggressor timing window 502 (as used in the prior art); an aggressor timing window 503 that is based on derived boundary timing constraints and, thereby limited and with less overlap of the victim timing window 501 as compared to the infinite timing window 502; and a revised aggressor timing window 504 that is based on derived boundary timing constraints after multiple iterations of the processes described above and, thereby further limited that the aggressor timing window 503 and with little overlap or no overlap (as shown) of the victim timing window 501.

Once the static timing analysis of the selected hierarchical entity is completed and, if applicable, any design adjustments are made, the processor 130 (or, if applicable, the timing abstraction generator 130(d)) can generate a timing abstraction for the selected hierarchical entity based on the results of the static timing analysis (which, as discussed above, can include the results of any noise coupling analysis and any other type of analyses typically performed as a part of a static timing analysis). This timing abstraction can be a non-limiting form of timing abstraction that only contains relevant timing information required for incorporating that selected hierarchical entity into the full top-level integrated circuit design 111. That is, the timing abstraction for the selected hierarchical entity will only contain periphery timing information (i.e., boundary timing information) that will impact adjacent hierarchical entities within the top-level integrated circuit design 111 (i.e., that will impact other hierarchical entities that interface with the selected hierarchical entity in the top-level integrated circuit design 111) and will not include any internal timing information. Alternatively, the timing abstraction can include a model wherein internal latch-latch details are preserved in the abstract graph.

In any case, after the timing abstraction for the selected hierarchical entity is generated (independently of any other hierarchical entities in the integrated circuit design, as discussed above), the processor 130 (or, if applicable, the boundary timing constraints calculator 130(a), the static timing analyzer 130(b) and the timing abstraction generator 130(c) in combination) can further independently generate other timing abstractions for other hierarchical entities within the integrated circuit design 111 using the above-described processes. Specifically, such timing abstractions should be generated for all of the different hierarchical entities in the integrated circuit design 111; however, only a single timing abstraction need be generated for multiple instances of the same hierarchical entity regardless of their location within the design.

The processor 130 (or, if applicable, the timing model generator 130(d)) can subsequently generate a timing model for the integrated circuit design 111 using all of these timing abstractions (i.e., the timing abstraction for the selected hierarchical entity and the other timing abstractions generated for the other hierarchical entities). Those skilled in the art will recognize that such a timing model can be used to predict the performance of the integrated circuit at issue and to verify that the integrated circuit, if manufactured according to the integrated circuit design 111, will function correctly. If a determination is made that the integrated circuit would not function correctly, the processor 130 (or, if applicable, the design editor 130(d)) can make adjustments to one or more of the hierarchical entities and the processor 130 (or, if applicable, the multiple different processors 130(a)-(e)) can repeat the above-described processes until such time as it is determined that the integrated circuit design 111 will function properly.

Once timing is closed and the integrated circuit design 111 is finalized, integrated circuits can be manufactured according to this design.

Figure 6:
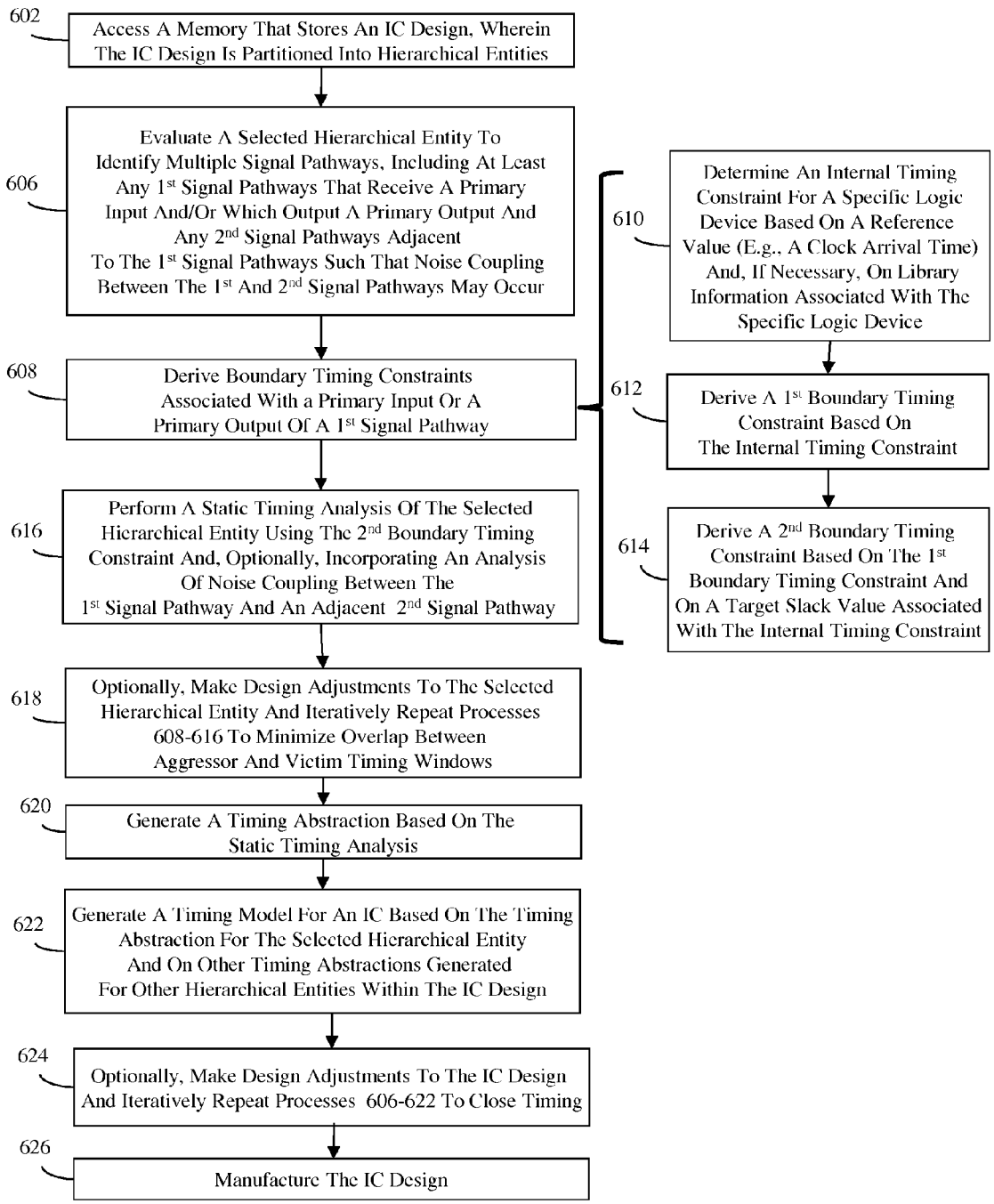
FIG. 6 is a flow diagram illustrating a method for performing a static timing analysis (STA) of an integrated circuit using a hierarchical approach.

Referring to the flow diagram of FIG. 6 in combination with FIG. 1, also disclosed herein is a method for performing a static timing analysis (STA) of an integrated circuit using a hierarchical approach. This method can comprise accessing a memory 110 (e.g., at least one computer readable storage medium, such as a computer readable storage device) that stores an integrated circuit design 111, which is partitioned into multiple hierarchical entities (602). That is, this integrated circuit design 111 can comprise a full top-level design for an integrated circuit and that full top-level design can incorporate multiple hierarchical entities. For purposes of this disclosure, a hierarchical entity refers to a block of logic (also referred to herein as a lower-level entity or macro). The multiple hierarchical entities can, for example, comprise different hierarchical entities as well as multiple instances of the same hierarchical entity. That is, the same hierarchical entity (i.e., a hierarchical entity with a specific design) may be reused at various different locations within the full top-level design 111 for the integrated circuit.

The method can further comprise evaluating a specific hierarchical entity, which was selected for analysis (e.g., by a designer over a user interface) from amongst the multiple hierarchical entities in the integrated circuit design, in order to identify multiple signal pathways including any first signal pathways that receive a primary input to the selected hierarchical entity and/or which output a primary output from the selected hierarchical entity and, optionally, any second signal pathways that are adjacent to the first signal pathways such that noise coupling between first and second signal pathways may occur (606). As discussed above, FIG. 2 illustrates a portion of an exemplary selected hierarchical entity 200. This hierarchical entity 200 comprises, among other signal pathways (not shown), a first signal pathway 210, which receives a primary input 215, and also a second signal pathway 220 adjacent to the first signal pathway 210. Noise coupling between the first signal pathway 210 and the second signal pathway 220 may occur and, particularly, the first signal pathway 210 may be an aggressor signal pathway and the second signal pathway 220 may be a victim signal pathway such that switching of the primary input 215 has the potential to impact a critical transition of the second signal pathway 220. FIG. 3 illustrates a portion of an exemplary hierarchical entity 300. This hierarchical entity 300 comprises, among other signal pathways (not shown), a first signal pathway 310, which outputs a primary output 316, and also a second signal pathway 320 adjacent to the first signal pathway 310. Noise coupling between the first signal pathway 310 and the second signal pathway 320 may occur and, particularly, the second signal pathway 320 may be an aggressor signal pathway and the first signal pathway 310 may be a victim such that signal switching of the second signal pathway 320 has the potential to impact the primary output 316 and, thereby the potential to violate the timing window of an external logic device downstream of the primary output 316.

The method further comprises, for each first signal pathway in the selected hierarchical entity, deriving boundary timing constraints, which can subsequently be used during a static timing analysis of the selected hierarchical entity (at process 616 described below) (608).

Specifically, in order to derive the boundary timing constraints associated with a first signal pathway at process 608, an internal timing constraint of at least one specific logic device within that first signal pathway can be determined (610). This internal timing constraint can be determined based on a reference value (e.g., a clock arrival time or some other reference value) and, if necessary, on library information 112, which is associated with that specific logic device (e.g., a pre-established timing test, also referred to as a pre-established timing window, for the specific logic device) and which is also stored in memory 110 along with the integrated circuit design 111. It should be noted that, when the first signal pathway receives a primary input to the selected hierarchical entity (as in the hierarchical entity 200 of FIG. 2), the specific logic device for which this internal timing constraint is determined should be an initial storage element (i.e., an initial flipflop or initial latch) within the first signal pathway. However, when the first signal pathway outputs a primary output (as in the hierarchical entity 300 of FIG. 3), the specific logic device for which this internal timing constraint is determined should be the last storage element (i.e., the last flipflop or last latch) within the first signal pathway. It should also be noted that the internal timing constraint and how it is determined will vary depending upon whether the specific logic device is the first (i.e., the initial) or last storage element within the first signal pathway.

For example, referring to the hierarchical entity 200 of FIG. 2, the primary input 215 can be propagated along the first signal pathway 210 (e.g., through any logic devices and/or connecting wires 219) to an initial storage element 211 (i.e., to the very first storage element within the first signal pathway 210), which is controlled by a reference signal (e.g., a clock signal 230). In this case, an internal timing constraint and, particularly, a required arrival time for the initial storage element 211 (ISE-RAT) can be determined at process 610 based on the arrival time of the clock signal 230 (CS-AT) at the initial storage element 211 and further based on library information associated with that initial storage element 211 (e.g., a pre-established timing test, also referred to as a pre-established timing window, for the initial storage element 211). Specifically, the ISE-RAT can be determined as the CS-AT plus the amount of time specified by the pre-established timing window for the initial storage element 211 as set forth in the library information. Thus, in this case, all that is required at the PI is a PI slew value, which can be used to calculate downstream delays and, thereby used to determine the internal timing constraint (i.e., the ISE-RAT).

Referring to the hierarchical entity 300 of FIG. 3, the first signal pathway 310 can comprise a storage element 311, which is the very last storage element in the first signal pathway 310 and which is controlled by a reference signal (e.g., a clock signal 330). This last storage element 311 can output a signal 313 that is propagated along the remaining portion of the first signal pathway (e.g., through any logic devices and/or connecting wires 319) and further out of the hierarchical entity (i.e., as the primary output 316) to an external logic device. In this case, an internal timing constraint and, particularly, the arrival time for the last storage element 311 (LSE-AT) within the first signal pathway 310 can, at process 610, be determined to be the same as (i.e., equal to) the arrival time of the clock signal 330 (CS-AT) at the last storage element 311 plus the propagation delay of the clock to output path through the last storage element 311, as indicated by library information that is specifically associated that last storage element 311.

Those skilled in the art will recognize that, unlike the boundary timing constraints of data signals (primary inputs and/or primary outputs) the timing constraints of a reference signal and, particularly, of a reference clock signal can be readily estimated out-of-context.

After the internal timing constraint is determined at process 610, multiple boundary timing constraints (e.g., an arrival time and a required arrival time) associated with the first signal pathway and, particularly, associated with the primary input (PI) or primary output (PO), as applicable, can be determined (612)-(614). Specifically, a first boundary timing constraint associated with the first signal pathway can be derived based on the internal timing constraint (612) and a second boundary timing constraint, which is also associated with the first signal pathway and which is different from the first boundary timing constraint, can be derived based on the first boundary timing constraint and also based on a target slack value associated with the internal timing constraint (614). It should be noted that the order in which these boundary timing constraints are derived (e.g., arrival time first or required arrival time first) will vary depending upon the internal timing constraint and whether boundary timing constraints are associated with a primary input (PI) or a primary output (PO).

For example, as mentioned above with regard to the hierarchical entity 200 of FIG. 2, the internal timing constraint determined at process 610 can be the required arrival time for the initial storage element 211 (ISE-RAT). This ISE-RAT can be propagated backwards through the first signal pathway 210 from the initial storage element 211 through the logic devices and/or connecting wires 219 and to the primary input (PI) in order to derive a first boundary timing constraint associated with the first signal pathway 210 and, particularly, a required arrival time for the primary input 215 (PI-RAT) at the hierarchical entity 200 (612). That is, a determination is made regarding the amount of time it would take for the primary input 215 to pass through the logic devices and/or connecting wires 219 and arrive at the initial storage element 211 and that amount of time is subtracted from the ISE-RAT in order to determine the PI-RAT. Subsequently, a second boundary timing constraint can be derived based on the first boundary timing constraint and further based on a target slack value for the internal timing constraint (i.e., for the ISE-RAT) (614). Specifically, an arrival time of the primary input (PI-AT) at the hierarchical entity 200 can be derived based on the PI-RAT, given, for example, a target slack value for the internal timing constraint of zero (i.e., given PI-AT=PI-RAT). Alternatively, an arrival time of the primary input (PI-AT) at the hierarchical entity 200 can be derived based on the PI-RAT, given some other target slack value for the internal timing constraint (e.g., a target positive slack or a target negative slack). This target slack value can, for example, be determined by the slack threshold used in the top-level design.

As mentioned above with regard to the hierarchical entity 300 of FIG. 3, the internal timing constraint determined at process 610 can be the arrival time for the last storage element 311 (LSE-AT) within the first signal pathway 310, which can be considered to be the same as (i.e., equal to) the arrival time of the clock signal 330 (CS-AT) plus the delay through the last storage element 311, as indicated by library information that is specifically associated the last storage element 311. This LSE-AT can be propagated forward through the first signal pathway 310 and, particularly, through the logic devices and/or connecting wires 319 to derive a first boundary timing constraint associated with the first signal pathway 310 and, particularly, an arrival time of the primary output 316 (PO-AT) at a downstream external logic device (i.e., a logic device that is outside of the hierarchical entity 300 and that receives the primary output 316) (612). That is, a determination is made regarding the amount of time it would take for the signal 313 from the last storage element 311 to pass through the logic devices and/or connecting wires 319 and arrive as the primary output 316 at the downstream external logic device. This amount of time is then added to the LSE-AT in order to determine the PO-AT. Subsequently, a second boundary timing constraint can be derived based on the first boundary timing constraint and based on a target slack value for the internal timing constraint (614). Specifically, a required arrival time for the primary output 316 (PO-RAT) at the downstream external logic device can be derived based on the PO-AT, given, for example, a target slack value for the internal timing constraint of zero (i.e., given PO-RAT=PO-AT). Alternatively, the required arrival time of the primary output 316 (PO-RAT) at the downstream external logic device can be derived based on the PO-AT, given some other target slack value for the internal timing constraint (e.g., a target positive slack or a target negative slack). This target slack value can be determined, for example, by the slack threshold used in the top-level design.

A static timing analysis (STA) of the selected hierarchical entity can subsequently be performed using the second boundary timing constraint to provide context at the PI or PO, as applicable (616). This static timing analysis can comprise, for example, a deterministic static timing analysis (DSTA), a statistical static timing analysis (SSTA) or any other suitable static timing analysis. That is, the static timing analysis can comprise any static timing analysis wherein timing quantities are propagated, including deterministic static timing analyses wherein the propagated timing quantities are deterministic scalar values or statistical static timing wherein the propagated timing quantities are statistical distributions represented, for example, in underlying canonical form. Furthermore, this static timing analysis may use any of gate-level timing, transistor-level timing, timing in the presence of multiple clock domains, timing involving separate propagation of rising and falling transitions, timing involving separate propagation for early and late mode signals, timing in the presence of clock gating tests, timing in the presence of domino tests, and/or any combinations thereof. Such techniques for performing static timing analyses are well known in the art and, thus, the details are omitted from this specification in order to allow the reader to focus on the salient aspects of the disclosed embodiments.

It should be noted that in selected hierarchical entities such as those shown in FIGS. 2-3, the static timing analysis performed at process 616 can, optionally, be performed so as to take into consideration noise coupling (i.e., cross-talk) between the first signal pathway and any second signal pathway that is immediately adjacent to the first signal pathway (also using the previously derived second boundary timing constraint). That is, the static timing analysis can also incorporate the performance of an analysis of noise coupling (i.e., an analysis of cross-talk). It should further be understood that, optionally, this static timing analysis of the selected hierarchical entity can also incorporate any other types of analyses typically performed as a part of a static timing analysis (e.g., delay analyses, glitch noise analyses, etc.).

For example, as mentioned above, the hierarchical entity 200 of FIG. 2 can further comprise a second signal pathway 220 that is immediately adjacent to the first signal pathway 210 such that noise coupling between the first signal pathway 210 and the second signal pathway may occur. Additionally, within the second signal pathway 220, a second storage element 222, which can also be controlled by the clock signal 230 (as shown), can output a signal 223 that is propagated along the second signal pathway 220 (e.g., through any logic devices and/or connecting wires 229). In this case, the static timing analysis performed at process 616 may incorporate a noise coupling analysis so that the aggressor timing window can be limited and further so that overlap between the victim timing window and the aggressor timing window can also be limited in order reduce the pessimism of the timing of the hierarchical entity 200 based on the results of the static timing analysis. Specifically, the second boundary timing constraint (i.e., the arrival time of the primary input (PI-AT)) can be propagated forward to the initial storage element 211. As a result of this forward propagation, more exact arrival time windows will be established for the net marked as aggressor. The more precise arrival time window computed for the aggressor net in first signal pathway 210 will reduce the chances of aggressor window overlap with victim net in the second signal pathway 220. This reduced overlap will result in a smaller noise event as can be computed by means known by those practicing the prior art.

Similarly, as mentioned above, the hierarchical entity 300 of FIG. 3 can also comprise a second signal pathway 320 that is immediately adjacent to the first signal pathway 310 such that noise coupling between the first signal pathway 210 and the second signal pathway may occur. Additionally, within the second signal pathway 320, a second storage element 322, which can also be controlled by the clock signal 330 (as shown), can output yet another signal 323 that is propagated along the second signal pathway 320 (e.g., through any logic devices and/or connecting wires 329). Again, the static timing analysis performed at process 616 may incorporate a noise coupling analysis so that the aggressor timing window can be limited and further sot that overlap between the victim timing window and the aggressor timing window can also be limited in order reduce the pessimism of the timing of the hierarchical entity based on the results of the static timing analysis. Specifically, the second boundary timing constraint (i.e., the required arrival time of the primary output 316 (PO-RAT)) can be propagated backward through the first signal pathway 310. As a result of this backward propagation, more exact required arrival time windows will be established for the net marked as victim. The more precise required arrival time for the net marked victim in the first signal pathway 310 will reduce the chances of aggressor window overlap with net marked aggressor in second signal pathway 320. This reduced overlap will result in a smaller noise event as can be computed by means known by those practicing the prior art.

Optionally, following performance of the static timing analysis at process 616, design adjustments can be made to the selected hierarchical entity based on the results of the static timing analysis (618). To accomplish this, the specific logic device can, for example, be replaced with a new logic device (i.e., a replacement logic device). Once the specific logic device is replaced, the following processes can be iteratively repeated to minimize overlap between victim and aggressor timing windows prior to generating a timing abstraction for the hierarchical entity or generating a model for the integrated circuit design 111, as described below: determining the internal timing constraint (in this case the internal timing constraint associated with the new logic device); deriving the first boundary timing constraint; deriving the second boundary timing constraint; performing the static timing analysis (including, if applicable, any noise coupling or other type of analyses typically performed as a part of a static timing analysis); and making design adjustments. See detailed discussion of FIGS. 4 and 5, above.

Once the timing analysis of the selected hierarchical entity is completed and, if applicable, any design adjustments are made, a timing abstraction for the selected hierarchical entity can be generated based on the results of the timing analysis (which, as discussed above, can include the results of any noise coupling analysis and any other type of analyses typically performed as a part of a static timing analysis) (620). This timing abstraction can be a non-limiting form of timing abstraction that only contains relevant timing information required for incorporating that selected hierarchical entity into the full top-level integrated circuit design 111. That is, the timing abstraction for the selected hierarchical entity will only contain periphery timing information (i.e., boundary timing information) that will impact adjacent hierarchical entities within the top-level integrated circuit design 111 (i.e., that will impact other hierarchical entities that interface with the selected hierarchical entity in the top-level integrated circuit design 111) and will not include any internal timing information. Alternatively, the timing abstraction can include a model wherein internal latch-latch details are preserved in the abstract graph.

After the timing abstraction for the selected hierarchical entity is independently generated (i.e., generated independently of any other hierarchical entities in the integrated circuit design, as discussed above), other timing abstractions for other hierarchical entities within the integrated circuit design 111 can also be independently generated using the above-described processes. Specifically, such timing abstractions should be generated for all of the different hierarchical entities in the integrated circuit design 111; however, only a single timing abstraction need be generated for multiple instances of the same hierarchical entity regardless of their location within the design.

Then, a timing model for the integrated circuit design 111 can be generated using all of these timing abstractions (i.e., the timing abstraction for the selected hierarchical entity and the other timing abstractions generated for the other hierarchical entities) (622). Those skilled in the art will recognize that such a timing model can be used to predict the performance of the integrated circuit at issue and to verify that the integrated circuit, if manufactured according to the integrated circuit design 111, will function correctly. If a determination is made that the integrated circuit would not function correctly, adjustments may be made to one or more of the hierarchical entities and the above-described processes can be iteratively repeated until such time as it is determined that the integrated circuit design 111 will function properly (624).

Once timing is closed and the integrated circuit design 111 is finalized, integrated circuits can be manufactured according to this design (626).

It should be noted in the above-description of the system and method for performing a static timing analysis (STA) of an integrated circuit using a hierarchical approach, FIGS. 2 and 3 are provided to illustrate the processes by which boundary timing constraints that are associated with a signal pathway having a primary input and/or a primary output can be derived in order to subsequently perform the static timing analysis (which optionally incorporates a noise coupling analysis between a first signal pathway and a second signal pathway within a selected hierarchical entity). It should, however, be understood that these figures are not intended to be limiting. Essentially the same processes that were described above as being used to derive the boundary timing constraints associated with the first signal pathways 210, 310 in FIGS. 2 and 3, respectively, can be applied to derive required boundary timing constraints for signal pathways in more complex hierarchical entities (e.g., in hierarchical entities where adjacent signal pathways receive different primary inputs, where adjacent signal pathways are controlled by different clock signals control, etc.).

Figure 7:
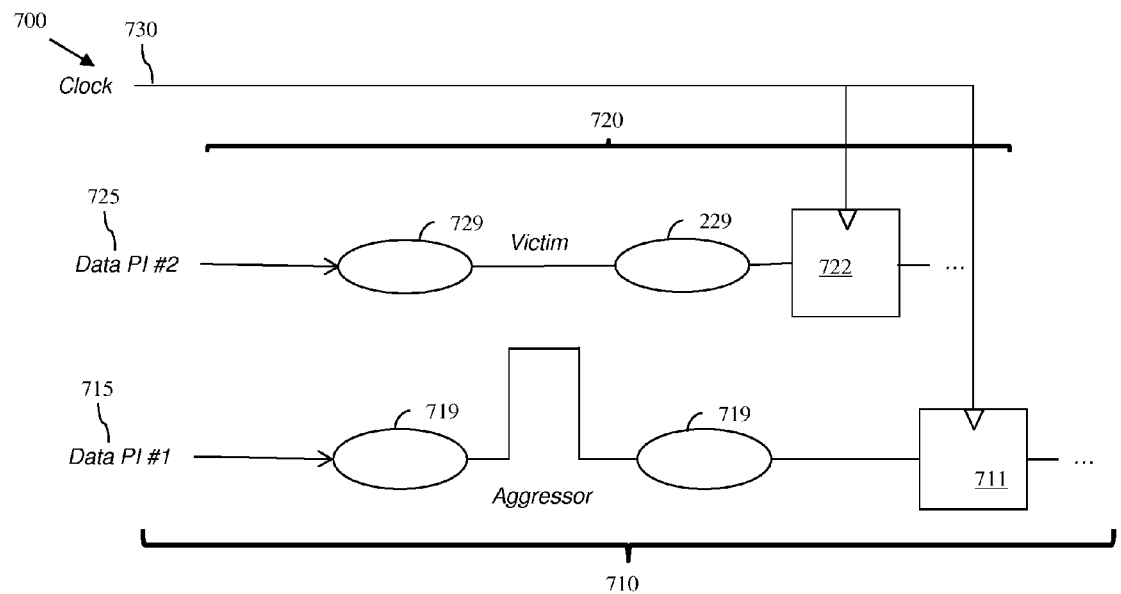
FIG. 7 is a schematic diagram illustrating a portion of yet another exemplary hierarchical entity that receives multiple data inputs.
Figure 8:
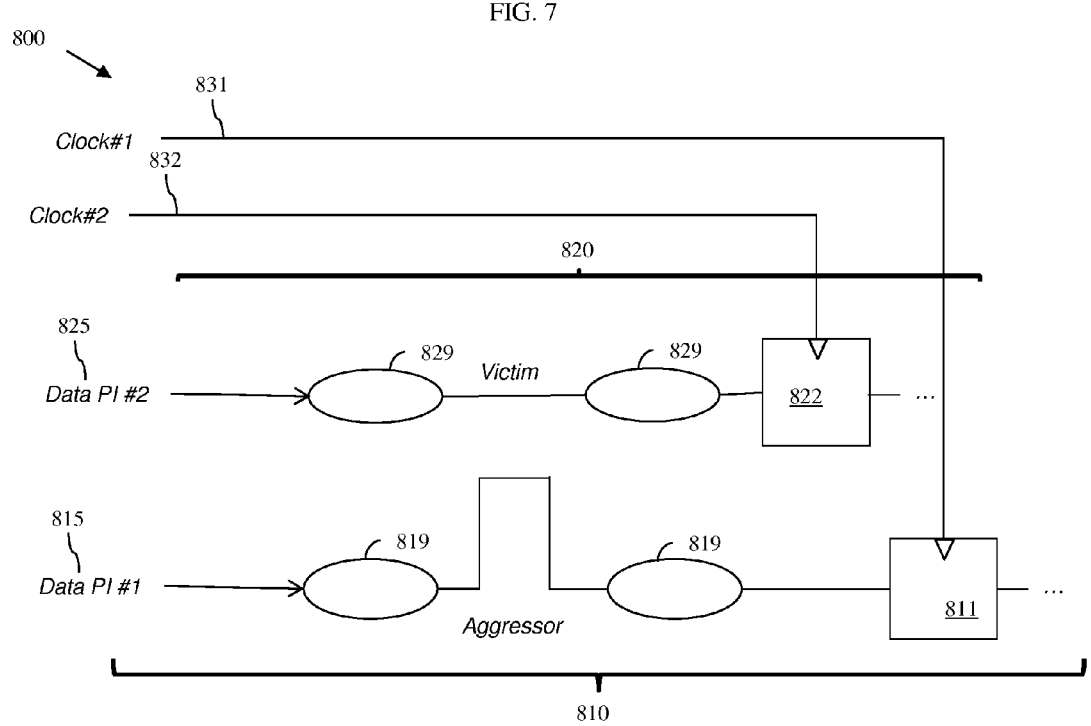
FIG. 8 is a schematic diagram illustrating a portion of yet another exemplary hierarchical entity controlled by multiple clock signals; and, FIG. 9 is a schematic diagram illustrating a representative hardware environment for implementing the static timing analysis as disclosed herein.

For example, FIGS. 7 and 8 illustrate portions of exemplary hierarchical entities 700 and 800, respectively. The hierarchical entities 700 and 800 each comprise, among other signal pathways (not shown), a first signal pathway 710, 810 and a second signal pathway 720, 820 adjacent to the first signal pathway 710, 810 such that noise coupling between signal pathways may occur. In both these hierarchical entities 700 and 800, the first and second signal pathways receive different primary inputs. That is, in both of these hierarchical entities 700, 800, the first signal pathway 710, 810 receives a first primary input 715, 815 and the second signal pathway 720, 820 receives a second primary input 725, 825. In the hierarchical entity 700, logic devices 711 and 722 in the first signal pathway 710 and the second signal pathway 720 are controlled by the same clock signals 730, whereas in the hierarchical entity 800, logic devices 811 and 822 in the first signal pathway 810 and the second signal pathway 820 are controlled by different clock signals 831 and 832, respectively.

In any case, noise coupling between the first signal pathway 710, 810 and the second signal pathway 720, 820 may occur and, particularly, the first signal pathway 710, 810 may be an aggressor signal pathway and the second signal pathway 720, 820 may be a victim signal pathway. For a noise coupling analysis between the first signal pathway 710, 810 and the second signal pathway 720, 820, boundary timing constraints including an arrival time of the first primary input 715, 815 ($1^{st}$ PI-AT) as well as an arrival time of the second primary input 725, 825 ($2^{nd}$ PI-AT) can be derived in essentially the same manner as described above with respect to deriving the PI-AT for the first signal pathway 210 of the hierarchical entity 200 of FIG. 2 discussed above. While PI data ATs are typically not known OOC, constraints on the relative ATs of clocks are likely to be known and can be derived by those skilled in the art. From these constraints, constraints on the relative ATs of the clocks to the devices 711 and 722 of FIG. 7 or the devices 811 and 822 of FIG. 8 can be computed, providing the required reference signals. That is, to derive the $1^{st}$ PI-AT, a first internal timing constraint and, particularly, a required arrival time for a first initial storage element 711, 811 ($1^{st}$ ISE-RAT) in the first signal pathway 710, 810 can be determined based on the arrival time of a clock signal 730, 831 at the first initial storage element 711, 811 and further based on library information associated with that first initial storage element 711, 811 (e.g., a pre-established timing test, also referred to as a pre-established timing window, for the first initial storage element). Similarly, to derive the $2^{nd}$ PI-AT, a second internal timing constraint and, particularly, a required arrival time for a second initial storage element 722, 822 ($2^{nd}$ ISE-RAT) in the second signal pathway 720, 820 can be determined based on the arrival time of a clock signal (and, particularly, the same clock signal 730, as shown in FIG. 7, or a second different clock signal 832, as shown in FIG. 8) at the second initial storage element 722, 822 and further based on library information associated with that second initial storage element 722, 822 (e.g., a pre-established timing test, also referred to as a pre-established timing window, for the second initial storage element). Next, the $1^{st}$ ISE-RAT can be propagated backwards through the first signal pathway 710, 810 from the first initial storage element 711, 811 through the logic devices and/or connecting wires 719, 819 and to the first primary input 715, 815 in order to derive a required arrival time for the first primary input 715, 815 ($1^{st}$ PI-RAT) at the hierarchical entity 700, 800. Similarly, the $2^{nd}$ ISE-RAT can be propagated backwards through the second signal pathway 720, 820 from the second initial storage element 722, 822 through the logic devices and/or connecting wires 729, 829 and to the second primary input 725, 825 in order to derive a required arrival time for the second primary input 725, 825 ($2^{nd}$ PI-RAT) at the hierarchical entity 700, 800. Subsequently, an arrival time of the first primary input ($1^{st}$ PI-AT) at the hierarchical entity 700, 800 can be derived based on the $1^{st}$ PI-RAT and an arrival time of the second primary input ($2^{nd}$ PI-AT) at the hierarchical entity 700, 800 can be derived based on the $2^{nd}$ PI-RAT. Once the $1^{st}$ PI-AT and the $2^{nd}$ PI-AT are derived, a static timing analysis including, but not limited to, the performance of an analysis of noise coupling (i.e., an analysis of cross-talk) between the first signal pathway 710, 810 and the second signal pathway 720, 820 can be performed using the derived $1^{st}$ PI-AT and the $2^{nd}$ PI-AT.

Also disclosed herein is a computer program product for performing static timing analysis (STA) of an integrated circuit using a hierarchical approach. The computer program product can comprise a computer readable storage medium having program instructions embodied therewith (e.g., stored thereon). These program instructions can be executable by the computer to cause the computer to perform the above-described method. More particularly, the present invention may be implemented as a method, a system and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
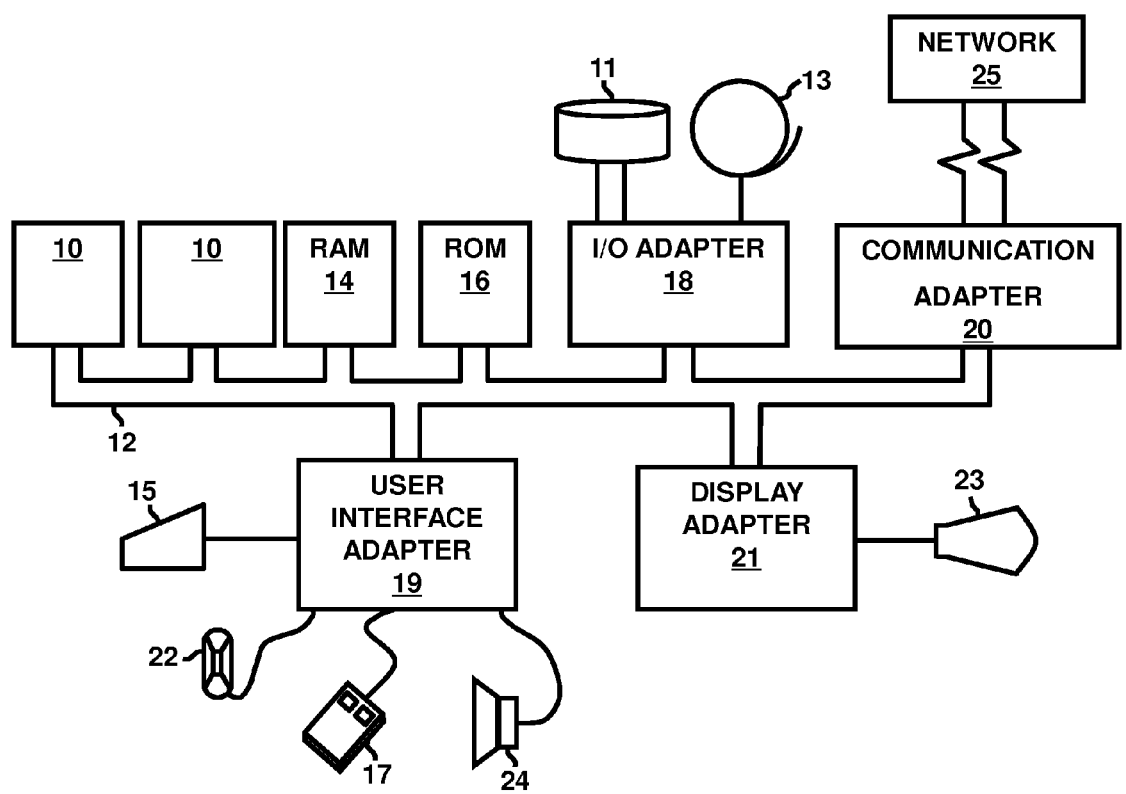

FIG. 9 depicts a representative hardware environment (i.e., a computer system) for implementing the static timing analysis as disclosed herein. Specifically, this schematic drawing illustrates a hardware configuration of an information handling/computer system, which can be programmed with the various software programs 115 described in detail above so as to become a special purpose computer for integrated circuit performance modeling. This computer system comprises one or more processors 10 including at least one specialized processor (see detailed discussion above regarding the specialized processor(s) 130 or 130(a)-(e)). The processor(s) 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are a system, a method and a computer program product for performing a static timing analysis (STA) of an integrated circuit using a hierarchical approach, wherein an internal timing constraint of a specific logic device in a first signal pathway of a hierarchical entity can be determined based on a reference value (e.g., a clock arrival time) and, if necessary, on library information for that specific logic device (e.g., a pre-established timing test for the specific logic device). A first boundary timing constraint associated with the first signal pathway can be derived based on the internal timing constraint and a second boundary timing constraint associated with the first signal pathway can be derived based on the first boundary timing constraint and a target slack value for the internal timing constraint. Subsequently, a static timing analysis of the hierarchical entity can be performed (e.g., using the second boundary timing constraint). Based on this static timing analysis, a timing abstraction for the hierarchical entity can be generated. By deriving the boundary timing constraints based on a known internal timing constraint, the resulting timing abstraction for the hierarchical entity is not overly pessimistic and is still valid for any possible context. A timing model for the integrated circuit design can then be generated using the timing abstraction for the hierarchical entity and other timing abstractions for other hierarchical entities within the integrated circuit design.

What is claimed is:

1. A system for performing a static timing analysis, said system comprising:
a memory storing an integrated circuit design partitioned into multiple hierarchical entities; and, at least one processor accessing said memory and identifying multiple signal pathways within a hierarchical entity selected for analysis from said multiple hierarchical entities, said multiple signal pathways identified by said processor comprising at least a first signal pathway, and said at least one processor further performing the following:

determining an internal timing constraint of a specific logic device in said first signal pathway based on a known reference value;

deriving a first boundary timing constraint associated with said first signal pathway based on said internal timing constraint;

deriving a second boundary timing constraint associated with said first signal pathway based on said first boundary timing constraint and a target slack value for said internal timing constraint, said first boundary timing constraint and said second boundary timing constraint are boundaries of valid timing signals for said hierarchical entity;

performing a static timing analysis of said hierarchical entity using said second boundary timing constraint;

making design adjustments to said hierarchical entity based on results of said static timing analysis;

iteratively repeating said determining of said internal timing constraint, said deriving of said first boundary timing constraint, said deriving of said second boundary timing constraint, said performing of said static timing analysis, and said making of said design adjustments in order to minimize overlap between victim and aggressor timing windows prior to generating an overall signal timing model for said integrated circuit design; and generating a timing abstraction for said hierarchical entity based on said static timing analysis, multiple ones of said timing abstraction being used to generate said overall signal timing model for said integrated circuit design.

2. The system of claim 1, said at least one processor further generating said overall signal timing model for said integrated circuit design using said timing abstraction for said hierarchical entity and other timing abstractions generated for other hierarchical entities within said integrated circuit design.

3. The system of claim 2, said multiple signal pathways identified by said processor further comprising a second signal pathway adjacent to said first signal pathway within said hierarchical entity and said static timing analysis taking into consideration noise coupling between said first signal pathway and said second signal pathway.

4. The system of claim 3,
said specific logic device comprising an initial storage element within said first signal pathway,
said first signal pathway comprising an aggressor signal pathway between a primary input and said specific logic device, and
said second signal pathway comprising a victim signal pathway.

5. The system of claim 4,
said memory further storing library information for logic devices in each of said hierarchical entities,
said internal timing constraint comprising a required arrival time for said specific logic device,
said known reference value being a clock arrival time,
said required arrival time for said specific logic device being determined based on said clock arrival time and a timing window for said specific logic device as indicated by said library information,
said first boundary timing constraint comprising a required arrival time for said primary input at said hierarchical entity, and
said second boundary timing constraint comprising an arrival time for said primary input at said hierarchical entity.

6. The system of claim 3,
said specific logic device comprising a last storage element within said first signal pathway,
said first signal pathway comprising a victim signal pathway between said specific logic device and a primary output, and
said second signal pathway comprising an aggressor signal pathway.

7. The system of claim 6,
said known reference value being a clock arrival time,
said internal timing constraint comprising an arrival time for said specific logic device, said arrival time for said specific logic device corresponding to said clock arrival time,
said first boundary timing constraint comprising an arrival time for said primary output at an external logic device, and
said second boundary timing constraint comprising a required arrival time for said primary output.

8. The system of claim 1, said static timing analysis comprising any of a deterministic static timing analysis and a statistical static timing analysis.

9. The system of claim 3, said first signal pathway and said second signal pathway being controlled by different clock signals.

10. A method of performing static timing analysis, said method comprising:

accessing a memory that stores an integrated circuit design that is partitioned into multiple hierarchical entities;

identifying multiple signal pathways in a hierarchical entity selected for analysis from amongst said multiple hierarchical entities, said multiple signal pathways comprising at least a first signal pathway;

determining an internal timing constraint of a specific logic device in said first signal pathway based on a known reference value;

deriving a first boundary timing constraint associated with said first signal pathway based on said internal timing constraint;

deriving a second boundary timing constraint associated with said first signal pathway based on said first boundary timing constraint and a target slack value for said internal timing constraint, said first boundary timing constraint and said second boundary timing constraint are boundaries of valid timing signals for said hierarchical entity;

performing a static timing analysis of said hierarchical entity using said second boundary timing constraint;

making design adjustments to said hierarchical entity based on results of said static timing analysis;

iteratively repeating said determining of said internal timing constraint, said deriving of said first boundary timing constraint, said deriving of said second boundary timing constraint, said performing of said static timing analysis, and said making of said design adjustments in order to minimize overlap between victim and aggressor timing windows prior to generating an overall signal timing model for said integrated circuit design; and generating a timing abstraction for said hierarchical entity based on said static timing analysis, multiple ones of said timing abstraction being used to analyze said overall signal timing model for said integrated circuit design.

11. The method of claim 10, further comprising generating said overall signal timing model for said integrated circuit design using said timing abstraction and other timing abstractions generated for other hierarchical entities within said integrated circuit design.

12. The method of claim 11, said multiple signal pathways further comprising a second signal pathway adjacent to said first signal pathway within said hierarchical entity and said static timing analysis being performed taking into consideration noise coupling between said first signal pathway and said second signal pathway.

13. The method of claim 12,
said specific logic device comprising an initial storage element within said first signal pathway,
said first signal pathway comprising an aggressor signal pathway between a primary input and said specific logic device, and
said second signal pathway comprising a victim signal pathway.

14. The method of claim 13,
said known reference value being a clock arrival time,
said memory further storing library information for logic devices in each of said hierarchical entities,
said internal timing constraint comprising a required arrival time for said specific logic device,
said required arrival time for said specific logic device being determined based on said clock arrival time and a timing window for said specific logic device as indicated by said library information,
said first boundary timing constraint comprising a required arrival time for said primary input at said hierarchical entity, and
said second boundary timing constraint comprising an arrival time for said primary input.

15. The method of claim 12,
said specific logic device comprising a last storage element within said first signal pathway,
said first signal pathway comprising a victim signal pathway between said specific logic device and a primary output, and
said second signal pathway comprising an aggressor signal pathway.

16. The method of claim 15,
said known reference value being a clock arrival time,
said internal timing constraint comprising an arrival time for said specific logic device, said arrival time for said specific logic device corresponding to said clock arrival time,
said first boundary timing constraint comprising an arrival time for said primary output at an external logic device, and
said second boundary timing constraint comprising a required arrival time for said primary output.

17. The method of claim 10, said static timing analysis comprising any of a deterministic static timing analysis and a statistical static timing analysis.

18. A computer program product comprising a non-transitory computer readable storage medium having program instructions embodied therewith, said program instructions being executable by a computer to cause said computer to perform a method for static timing analysis, said method comprising:

accessing a memory that stores an integrated circuit design that is partitioned into multiple hierarchical entities;

identifying multiple signal pathways in a hierarchical entity selected for analysis from amongst said multiple hierarchical entities, said multiple signal pathways comprising at least a first signal pathway;

determining an internal timing constraint of a specific logic device in said first signal pathway based on a known reference value;

deriving a first boundary timing constraint associated with said first signal pathway based on said internal timing constraint;

deriving a second boundary timing constraint associated with said first signal pathway based on said first boundary timing constraint and a target slack value for said internal timing constraint, said first boundary timing constraint and said second boundary timing constraint are boundaries of valid timing signals for said hierarchical entity;

performing a static timing analysis of said hierarchical entity using said second boundary timing constraint;

making design adjustments to said hierarchical entity based on results of said static timing analysis;

iteratively repeating said determining of said internal timing constraint, said deriving of said first boundary timing constraint, said deriving of said second boundary timing constraint, said performing of said static timing analysis, and said making of said design adjustments in order to minimize overlap between victim and aggressor timing windows prior to generating an overall signal timing model for said integrated circuit design; and generating a timing abstraction for said hierarchical entity based on said static timing analysis, multiple ones of said timing abstraction being used to analyze said overall signal timing model for said integrated circuit design.

* * * * *